(12) United States Patent
Ramamurthy et al.

(10) Patent No.: US 11,405,415 B2
(45) Date of Patent: Aug. 2, 2022

(54) SYSTEM AND METHOD FOR SELECTION OF CLOUD SERVICE PROVIDERS IN A MULTI-CLOUD

(71) Applicant: Tata Consultancy Services Limited, Mumbai (IN)

(72) Inventors: Arun Ramamurthy, Hadapsar (IN); Mangesh Sharad Gharote, Hadapsar (IN); Saket Kumar Saurabh, Hadapsar (IN); Sachin Premsukh Lodha, Hadapsar (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 264 days.

(21) Appl. No.: 16/826,791

(22) Filed: Mar. 23, 2020

(65) Prior Publication Data
US 2021/0176266 A1 Jun. 10, 2021

(30) Foreign Application Priority Data

Dec. 6, 2019 (IN) .............................. 201921050531

(51) Int. Cl.
*H04L 29/06* (2006.01)
*H04L 29/08* (2006.01)
(Continued)

(52) U.S. Cl.
CPC ...... *H04L 63/1433* (2013.01); *G06F 9/45558* (2013.01); *G06F 9/5072* (2013.01);
(Continued)

(58) Field of Classification Search
CPC . H04L 63/1433; H04L 67/10; G06F 9/45558; G06F 9/5072; G06F 9/5077; G06F 2009/45587; G06F 2009/45595
(Continued)

(56) References Cited

U.S. PATENT DOCUMENTS 8,782,241 B2 * 7/2014 Tung ................... H04L 67/1002
709/200
9,307,493 B2 * 4/2016 Backholm ......... H04W 52/0251
(Continued)

FOREIGN PATENT DOCUMENTS

| CN | 108418767 B | * | 12/2021 | ............... H04L 47/11 |
| EP | 3832464 A1 | * | 6/2021 | ......... G06F 9/45558 |

(Continued)

OTHER PUBLICATIONS

Ming-Hua Lin et al., "Optimal Allocation of Virtual Machines in Cloud Computing," Symmetry, Received: Nov. 23, 2018; Accepted: Dec. 12, 2018; Published: Dec. 15, 2018, pp. 1-9.
(Continued)

*Primary Examiner* — David R Lazaro
*Assistant Examiner* — Berhanu Shitayewoldetadik
(74) *Attorney, Agent, or Firm* — Finnegan, Henderson, Farabow, Garrett & Dunner LLP

(57) ABSTRACT

This disclosure relates generally to selection of cloud service providers in a multi-cloud. The selection of cloud service providers (CSPs) in a multi-cloud environment is challenging as it depends on multiple criteria such as security, usability, latency, and service cost. In an embodiment, for each CSP and multi-CSP combination, two decision problems are solved; namely, a VM selection problem and a cloud region selection problem, taking latency requirement and DR laws constraints into consideration. By solving the VM selection and CC selection problems, the service cost and the user to cloud region mapping are estimated. Using said estimates and other qualitative criteria, a multi-cloud multi-criteria decision problem is solved using MCDM techniques to rank the CSP combinations for each application. Based on the ranks and a constraint on a service cost
(Continued)

of the entity one of a CSP and a CSP combination is selected for each application.

13 Claims, 8 Drawing Sheets

(51) Int. Cl.
| | |
|---|---|
| *G06F 9/455* | (2018.01) |
| *H04L 15/16* | (2006.01) |
| *G06F 15/16* | (2006.01) |
| *H04L 12/24* | (2006.01) |
| *G06F 11/36* | (2006.01) |
| *H04L 9/40* | (2022.01) |
| *H04L 67/10* | (2022.01) |
| *G06F 9/50* | (2006.01) |

(52) U.S. Cl.
CPC ............ *G06F 9/5077* (2013.01); *H04L 67/10* (2013.01); *G06F 2009/45587* (2013.01); *G06F 2009/45595* (2013.01)

(58) Field of Classification Search
USPC ......................................................... 709/226
See application file for complete search history.

(56) References Cited

U.S. PATENT DOCUMENTS

| | | | |
|---|---|---|---|
| 9,716,724 B1* | 7/2017 | Chennuru | H04L 63/08 |
| 10,270,796 B1* | 4/2019 | Veeraswamy | H04L 63/1433 |
| 10,671,953 B1* | 6/2020 | Xu | G06F 9/5088 |
| 10,673,952 B1* | 6/2020 | Cohen | H04L 67/16 |
| 10,678,593 B1* | 6/2020 | Zhang | G06F 9/50 |
| 10,761,875 B1* | 9/2020 | Burgin | G06F 9/505 |
| 10,771,252 B1* | 9/2020 | Teng | H04L 9/0897 |
| 11,068,809 B2* | 7/2021 | Littlejohn | H04L 67/36 |
| 11,263,055 B1* | 3/2022 | Deng | G06F 9/5077 |
| 11,269,677 B2* | 3/2022 | Paul | G06F 9/4893 |
| 2004/0139147 A1* | 7/2004 | Duquenne | H04L 69/329 709/200 |
| 2011/0246994 A1* | 10/2011 | Kimbrel | G06Q 10/06 718/104 |
| 2011/0300873 A1* | 12/2011 | Wen | H04W 16/02 455/450 |
| 2012/0233315 A1* | 9/2012 | Hoffman | G06F 9/5072 709/224 |
| 2012/0240124 A1* | 9/2012 | Lipton | G06F 9/5066 718/104 |
| 2013/0019015 A1* | 1/2013 | Devarakonda | G06F 9/5072 709/226 |
| 2013/0042123 A1* | 2/2013 | Smith | G06F 9/5077 713/300 |
| 2013/0055091 A1* | 2/2013 | Dutta | G06F 3/04842 715/736 |
| 2013/0111035 A1* | 5/2013 | Alapati | G06F 9/5072 709/226 |
| 2014/0201100 A1* | 7/2014 | Rellas | G06Q 30/0607 705/330 |
| 2014/0278807 A1 | 9/2014 | Bohacek | |
| 2014/0282536 A1* | 9/2014 | Dave | G06F 9/45558 718/1 |
| 2014/0365662 A1* | 12/2014 | Dave | G06F 9/45533 709/226 |
| 2015/0206207 A1* | 7/2015 | Narasimhan | H04L 67/1004 705/400 |
| 2015/0222723 A1* | 8/2015 | Adapalli | G06Q 10/0633 705/26.41 |
| 2015/0281113 A1* | 10/2015 | Siciliano | G06F 9/5072 709/226 |
| 2015/0341240 A1* | 11/2015 | Iyoob | H04L 41/5054 709/201 |
| 2015/0356428 A1* | 12/2015 | Sanchez | H04L 67/1097 706/12 |
| 2016/0019636 A1* | 1/2016 | Adapalli | H04L 47/78 705/26.81 |
| 2016/0065417 A1* | 3/2016 | Sapuram | H04L 41/5019 709/223 |
| 2016/0092702 A1* | 3/2016 | Durham | G06F 9/35 713/190 |
| 2016/0203424 A1* | 7/2016 | Gaurav | G06Q 10/0631 705/7.12 |
| 2016/0328577 A1* | 11/2016 | Howley | G16H 20/60 |
| 2016/0380906 A1* | 12/2016 | Hodique | H04L 67/1023 709/226 |
| 2017/0024657 A1* | 1/2017 | Sahu | G06F 16/951 |
| 2017/0041384 A1* | 2/2017 | Son | H04L 67/1002 |
| 2017/0078216 A1* | 3/2017 | Adolph | H04L 67/16 |
| 2017/0149625 A1* | 5/2017 | Chitti | H04L 67/10 |
| 2017/0220782 A1* | 8/2017 | Alsanousi | G16H 80/00 |
| 2017/0270449 A1* | 9/2017 | Shrimali | G06F 8/00 |
| 2018/0077135 A1* | 3/2018 | Wardman | H04L 63/0421 |
| 2018/0165698 A1* | 6/2018 | Chandrashekar | G06Q 30/0206 |
| 2018/0167439 A1* | 6/2018 | Huang | H04L 67/10 |
| 2018/0246763 A1* | 8/2018 | Eno | G06Q 50/10 |
| 2018/0287864 A1* | 10/2018 | Hockett | G06N 20/00 |
| 2019/0050213 A1* | 2/2019 | Schanafelt | G06F 16/9038 |
| 2019/0158367 A1* | 5/2019 | Barooah | H04L 41/5096 |
| 2019/0188049 A1* | 6/2019 | Choudhary | G06F 8/425 |
| 2019/0206569 A1* | 7/2019 | Shelton, IV | H04L 67/12 |
| 2019/0356724 A1* | 11/2019 | Adams | H04L 67/18 |
| 2019/0386969 A1* | 12/2019 | Verzun | H04L 9/3239 |
| 2020/0007819 A1* | 1/2020 | Dahle | H04L 12/1827 |
| 2020/0065128 A1* | 2/2020 | Nag | G06N 3/006 |
| 2020/0065156 A1* | 2/2020 | Nag | G06N 3/02 |
| 2020/0065157 A1* | 2/2020 | Nag | G06N 3/02 |
| 2020/0065702 A1* | 2/2020 | Nag | G06N 7/043 |
| 2020/0133739 A1* | 4/2020 | Jain | G06F 9/5077 |
| 2020/0162378 A1* | 5/2020 | Ma | H04L 45/124 |
| 2020/0193243 A1* | 6/2020 | Dhurandhar | G06N 3/04 |
| 2020/0275357 A1* | 8/2020 | Bordeleau | H04L 41/046 |
| 2020/0275358 A1* | 8/2020 | Bordeleau | H04L 41/5054 |
| 2020/0275359 A1* | 8/2020 | Bordeleau | H04L 12/66 |
| 2020/0287974 A1* | 9/2020 | Gnessin | H04L 43/08 |
| 2020/0310847 A1* | 10/2020 | Schulze | H04L 67/10 |
| 2020/0336420 A1* | 10/2020 | Joshi | G06F 9/45558 |
| 2020/0351336 A1* | 11/2020 | Campbell | G06F 9/5072 |
| 2020/0382578 A1* | 12/2020 | Lu | H04L 45/04 |
| 2020/0396301 A1* | 12/2020 | Abhigyan | H04L 45/34 |
| 2020/0404069 A1* | 12/2020 | Li | G06F 9/4862 |
| 2021/0019194 A1* | 1/2021 | Bahl | H04L 67/34 |
| 2021/0099354 A1* | 4/2021 | Panigrahi | G06F 9/45558 |
| 2021/0142254 A1* | 5/2021 | Bougon | G06F 3/04842 |
| 2021/0176266 A1* | 6/2021 | Ramamurthy | G06F 9/5072 |
| 2021/0208983 A1* | 7/2021 | Lin | G06N 3/0445 |
| 2022/0050717 A1* | 2/2022 | Deng | G06F 9/505 |

FOREIGN PATENT DOCUMENTS

| | | | | |
|---|---|---|---|---|
| WO | WO-2009111799 A2 * | 9/2009 | ............ | G06F 9/4856 |
| WO | WO-2010127365 A1 * | 11/2010 | ............ | G06F 9/5077 |
| WO | WO-2017209988 A1 * | 12/2017 | ......... | G06F 9/45558 |
| WO | WO-2019135249 A1 * | 7/2019 | .............. | G06F 9/44 |
| WO | WO-2020190256 A1 * | 9/2020 | ............ | G06F 9/5005 |

OTHER PUBLICATIONS

Ioannis Patiniotakis et al., "PuLSaR: preference-based cloud service selection for cloud service brokers," Journal of Internet Services and Applications, Mar. 9, 2015, pp. 1-14.
Chandrashekar Jatoth et al., "SELCLOUD: a hybrid multi-criteria decision-making model for selection of cloud services," https://doi.org/10.1007/s00500-018-3120-2, Soft Computing (2019), pp. 4701-4715.
Abdelkhalik Mosa et al., "Optimizing virtual machine placement for energy and SLA in clouds using utility functions," Journal of Cloud Computing: Advances, Systems and Applications (2016), pp. 1-17.
Constanţa Zoie Rădulescu et al., "An Extended TOPSIS Approach for Ranking Cloud Service Providers," http://www.sic.ici.ro, Studies in Informatics and Control, 26(2) 183-192, Jun. 2017, https://doi.org/10.24846/v26i2y201706, pp. 1-5.

(56) References Cited

OTHER PUBLICATIONS

Simarro, J. L. L., Moreno-Vozmediano, R., Montero, R. S., & Llorente, I. M. "Dynamic placement of virtual machines for cost optimization in multi-cloud environments." In 2011 IEEE International Conference on High Performance Computing & Simulation (2011); (pp. 1-7).

* cited by examiner

| CSP Combinations | Cost ($) | Latency | Coverage | Management Complexity | Security | Usability | Closeness Coefficient | Rank |
|---|---|---|---|---|---|---|---|---|
| {1} | 41416 | 51.1 | 27 | 1 | 4 | 9.21 | 0.84 | 12 |
| {2} | 52136 | 88.2 | 22 | 1 | 7 | 8.00 | 0.54 | 8 |
| {3} | 64280 | 45.7 | 22 | 1 | 7 | 8.00 | 0.42 | 14 |
| {4} | 47423 | 46.3 | 25 | 1 | 6 | 7.50 | 0.45 | 13 |
| {1,2} | 50114 | 66.7 | 37 | 2 | 4 | 8.60 | 0.57 | 3 |
| {1,3} | 64887 | 60.4 | 37 | 2 | 4 | 8.60 | 0.55 | 11 |
| {1,4} | 67307 | 74.3 | 45 | 2 | 4 | 7.00 | 0.56 | 6 |
| {2,3} | 68537 | 71.7 | 40 | 2 | 6 | 8.00 | 0.58 | 1 |
| {2,4} | 65060 | 57.7 | 40 | 2 | 6 | 8.00 | 0.58 | 2 |
| {3,4} | 69842 | 72.4 | 43 | 2 | 6 | 7.70 | 0.41 | 15 |
| {1,2,3} | 68980 | 78.7 | 45 | 3 | 4 | 8.00 | 0.56 | 5 |
| {1,2,4} | 72476 | 79.6 | 45 | 3 | 4 | 6.50 | 0.57 | 4 |
| {1,3,4} | 74978 | 79.1 | 45 | 3 | 4 | 7.00 | 0.53 | 10 |
| {2,3,4} | 78160 | 82.1 | 47 | 3 | 6 | 8.00 | 0.56 | 9 |
| {1,2,3,4} | 76671 | | | 4 | 4 | 6.75 | 0.51 | 8 |

TABLE 2: TOPSIS RANK FOR CSP COMBINATIONS. LATENCY THRESHOLD(L) = 3 AND DR LAWS ARE CONSIDERED

FIG. 5A

TABLE 3: TOPSIS RANK FOR TWO SCENARIOS: ($\bar{L} = 3$, WITHOUT DR LAWS) AND ($\bar{L} = 4$, WITH DR LAWS)

FIG. 5C

TABLE 4: RANK OF CSP COMBINATIONS FOR MULTIPLE APPLICATIONS HOSTED BY AN ENTERPRISE

FIG. 5D

| Budget ($) | Application 1 | | | Application 2 | | | Application 3 | | |
|---|---|---|---|---|---|---|---|---|---|
| | CSP Combination | Rank | Coverage | CSP Combination | Rank | Coverage | CSP Combination | Rank | Coverage |
| 210000 | {1} | 9 | 30 | {2} | 7 | 33 | {2} | 13 | 33 |
| 242000 | {2,3} | 4 | 41 | {2} | 7 | 33 | {2,3} | 1 | 41 |
| 260000 | {1,2} | 1 | 43 | {2,4} | 3 | 40 | {2,3} | 1 | 41 |
| 262000 | {1,2} | 1 | 43 | {2,3} | 1 | 41 | {2,3} | 1 | 41 |

TABLE 5: IMPLICATIONS OF BUDGET ON CSP SELECTION.

FIG. 5E

SYSTEM AND METHOD FOR SELECTION OF CLOUD SERVICE PROVIDERS IN A MULTI-CLOUD

PRIORITY CLAIM

This U.S. patent application claims priority under 35 U.S.C. § 119 to: India Application No. 201921050531, filed on Dec. 6, 2019. The entire contents of the aforementioned application are incorporated herein by reference.

TECHNICAL FIELD

The disclosure herein generally relates to multi-cloud environment, and, more particularly, to a system and method for selecting cloud service providers in multi-cloud environment.

BACKGROUND

Entities, these days, are adopting multi-cloud based solutions to meet the compute requirements of their applications. Multi-cloud helps to avoid vendor lock-in, to provide good quality of service at a low cost, and to abide by data residency laws.

The selection of cloud service providers (CSPs) in a multi-cloud environment is challenging as it depends on multiple criteria such as security, usability, latency, and service cost. The popular CSPs need not be the best option for entity requirements. In certain scenarios, it may be beneficial to select a combination of local and global CSPs for meeting entity requirements.

SUMMARY

Embodiments of the present disclosure present technological improvements as solutions to one or more of the above-mentioned technical problems recognized by the inventors in conventional systems. For example, in one embodiment, a method for selection of cloud service providers (CSPs) in a multi-cloud is provided. The method includes enabling, via one or more hardware processors, a plurality of user centers (UCs) to access a multi-cloud having a plurality of CSPs, each CSP of the plurality of CSPs includes a plurality of CCs, each CC of the plurality of CCs capable of accessing a plurality of distinct VMs, each VM of the plurality of distinct VMs associated with distinct configuration. Further, the method includes obtaining, for a user center (UC), an optimal compute center (CC) from amongst a plurality of CCs associated with a plurality cloud service providers (CSPs), via one or more hardware processors. The method for obtaining the optimal CC includes determining, for each CSP of the plurality of CSPs, a count and type of a set of VMs to be utilized for meeting compute demand of the UC, the count and the type of the set of VMs determined by using a virtual machine (VM) selection model based on one or more compute specifications of the set of VMs and a cost criteria, the set of VMs associated with a CC from amongst the plurality of CCs capable of serving the UC, wherein the cost criteria facilitates in determining a consolidated cost associated with serving the UC based on the determination of the count and the type of the set of VM. Also, the method includes, determining the optimal CC for the UC from amongst the plurality of CCs belonging to each of plurality of CSPs and a plurality of CSP combination by using a CC selection model, the CC selection model applying at least a latency constraint and a location constraint and the consolidated cost to determine the optimal CC associated with the CSP for the UC. Furthermore, the method includes assigning, based on a determination of the optimal CC for each of the plurality of CSPs and a plurality of CSP combinations, and a plurality of qualitative criteria, a rank to each of the plurality of CSPs and the plurality of CSP combinations using a multi-criteria decision making (MCDM) Technique, via the one or more hardware processors. Moreover, the method include selecting, via the one or more hardware processors, one of a CSP and a CSP combination from amongst the plurality of CSPs and the plurality of combinations for the application based on the ranks and a cost criteria.

In another aspect, a system for selection of cloud service providers (CSPs) in a multi-cloud is provided. The system includes one or more memories; and one or more first hardware processors, the one or more first memories coupled to the one or more first hardware processors, wherein the one or more first hardware processors are configured to execute programmed instructions stored in the one or more first memories to enabling a plurality of user centers (UCs) to access a multi-cloud having a plurality of CSPs, each CSP of the plurality of CSPs includes a plurality of CCs, each CC of the plurality of CCs capable of accessing a plurality of distinct VMs, each VM of the plurality of distinct VMs associated with distinct configuration. Further, the one or more hardware processors are configured by the instructions to obtain, for a user center (UC), an optimal compute center (CC) from amongst a plurality of CCs associated with a plurality cloud service providers (CSPs). The one or more hardware processors are configured by the instructions to obtain the optimal CC by determining, for each CSP of the plurality of CSPs, a count and type of a set of VMs to be utilized for meeting compute demand of the UC, the count and the type of the set of VMs determined by using a virtual machine (VM) selection model based on one or more compute specifications of the set of VMs and a cost criteria, the set of VMs associated with a CC from amongst the plurality of CCs capable of serving the UC, wherein the cost criteria facilitates in determining a consolidated cost associated with serving the UC based on the determination of the count and the type of the set of VM. Also, the one or more hardware processors are configured by the instructions to determine the optimal CC for the UC from amongst the plurality of CCs belonging to each of plurality of CSPs and a plurality of CSP combination by using a CC selection model, the CC selection model applying at least a latency constraint and a location constraint and the consolidated cost to determine the optimal CC associated with the CSP for the UC. Furthermore, the one or more hardware processors are configured by the instructions to includes assigning, based on a determination of the optimal CC for each of the plurality of CSPs and a plurality of CSP combinations, and a plurality of qualitative criteria, a rank to each of the plurality of CSPs and the plurality of CSP combinations using a multi-criteria decision making (MCDM) Technique, via the one or more hardware processors. Moreover, the one or more hardware processors are configured by the instructions to select one of a CSP and a CSP combination from amongst the plurality of CSPs and the plurality of combinations for the application based on the ranks and a cost criteria.

In yet another aspect, a non-transitory computer readable medium for a method for selection of cloud service providers (CSPs) in a multi-cloud is provided. For example, in one embodiment, the method includes enabling, via one or more hardware processors, a plurality of user centers (UCs) to access a multi-cloud having a plurality of CSPs, each CSP of the plurality of CSPs includes a plurality of CCs, each CC of the plurality of CCs capable of accessing a plurality of distinct VMs, each VM of the plurality of distinct VMs associated with distinct configuration. Further, the method includes obtaining, for a user center (UC), an optimal compute center (CC) from amongst a plurality of CCs associated with a plurality cloud service providers (CSPs), via one or more hardware processors. The method for obtaining the optimal CC includes determining, for each CSP of the plurality of CSPs, a count and type of a set of VMs to be utilized for meeting compute demand of the UC, the count and the type of the set of VMs determined by using a virtual machine (VM) selection model based on one or more compute specifications of the set of VMs and a cost criteria, the set of VMs associated with a CC from amongst the plurality of CCs capable of serving the UC, wherein the cost criteria facilitates in determining a consolidated cost associated with serving the UC based on the determination of the count and the type of the set of VM. Also, the method includes, determining the optimal CC for the UC from amongst the plurality of CCs belonging to each of plurality of CSPs and a plurality of CSP combination by using a CC selection model, the CC selection model applying at least a latency constraint and a location constraint and the consolidated cost to determine the optimal CC associated with the CSP for the UC. Furthermore, the method includes assigning, based on a determination of the optimal CC for each of the plurality of CSPs and a plurality of CSP combinations, and a plurality of qualitative criteria, a rank to each of the plurality of CSPs and the plurality of CSP combinations using a multi-criteria decision making (MCDM) Technique, via the one or more hardware processors. Moreover, the method include selecting, via the one or more hardware processors, one of a CSP and a CSP combination from amongst the plurality of CSPs and the plurality of combinations for the application based on the ranks and a cost criteria.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 5A-5E illustrates experimental results for an example scenario for CSP selection in a multi-cloud environment in accordance with an example embodiment.

DETAILED DESCRIPTION

Figure 1:
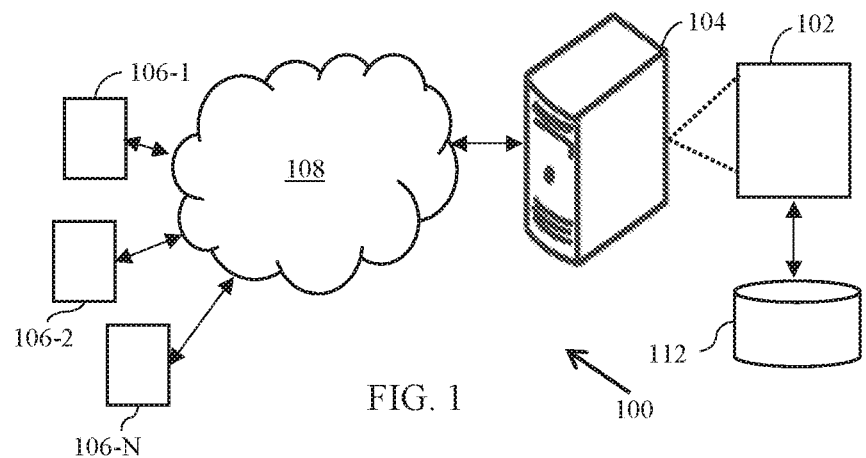
FIG. 1 illustrates an example implementation of a system for CSP selection in a multi-cloud environment in accordance with an example embodiment.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Multinational entities (such as banks) host multiple web applications for their users. While the users expect good Quality of Service (QoS) when accessing these applications, entity wants to provide the applications at a low cost. Entities also want web servers to scale with changes in user demand. As cloud technology offers scalability, high cost benefits (pay-per-use policy), low initial setup time, high security, and high-quality APIs, entities have started using services offered by Cloud Service Providers (CSPs) to host their web applications.

Many competitive local CSPs are entering the cloud market, along with global CSPs such as Amazon AWS™, Microsoft Azure™, and Google Cloud™. These global CSPs may not necessarily be the best option for an entity's requirement. An entity can benefit from using a combination of services offered by local and global CSPs. Such a multi-cloud system offers advantages such as no vendor lock-in, good QoS (such as latency) to users, and reduction in service cost.

Typically, selection of a best or most optimal multi-cloud combinations from amongst several CSP combinations ($2^n-1$, where n is the number of cloud providers) for hosting multiple applications of an entity is a challenging task as there are multiple criteria, both qualitative (for example: security, manageability and so on) and quantitative (for example: cost, latency and so non), that need to be considered for selection. Various conventional techniques are known for single CSP selection using Multiple-Criteria Decision-Making (MCDM) techniques. Popular MCDM techniques such as Analytic Hierarchy Process (AHP), Technique for Order of Preference by Similarity to Ideal Solution (TOPSIS), and hybrid framework combining different MCDM methods are used for ranking the cloud providers. However, none of the aforementioned techniques have addressed multi-cloud selection using MCDM.

Typically, various criteria are required to be met for CSP selection. Cost and QoS are some of the most important criteria for cloud selection. The values for said criteria depend on the selection of virtual machines (VMs) and assignment of cloud centres (CCs) to the entity users. For the VM selection problem, various heuristic, metaheuristic and, recently, reinforcement learning based algorithms have been proposed. Further, the CC selection problem has been addressed using exact, heuristic and metaheuristic algorithms. However, none of the conventional techniques that have used MCDM to rank CSPs have considered the VM selection and CC selection problems while computing cost and QoS.

While addressing the CSP selection in a multi-cloud environment, typically only the cost-performance trade-off is considered. One conventional technique utilizes an integer optimization model and Biased Random-key Genetic Algorithm for VM selection in a multi-cloud environment. The goal of said technique was to select the VMs such that compute demands (storage, memory and processing speed) are satisfied at minimal cost. Another conventional technique utilize a heuristic algorithm to select CSPs and CCs for serving the users such that the availability of service is high and service cost is minimum. Similarly, yet another known technique utilizes dynamic programming to select CSPs that ensure high availability and low response time for users. Use of metaheuristic algorithms to select CSPs in a multi-cloud environment is known. However, in a typical multi-cloud selection, other important criteria such as security, manageability, and usability are disregarded in the literature. Along with said criteria, compliance with Data Residency (DR) laws have emerged as an important factor for CC and CSP selection. DR is defined as the set of issues and practices related to the location of data and metadata, the movement of (meta)data across geographies and jurisdictions, and the protection of that (meta)data against unintended access and other location-related risks. DR laws are enforced by government bodies on entities to protect the privacy of citizens and to facilitate easy inspection of data. DR laws vary across countries and depend on the type of data processed. Non-compliance to DR laws leads to hefty penalties and loss of reputation. Thus, while choosing CCs, entities have to ensure that Data Residency (DR) laws are not violated. Typically, techniques applied for CC selection and CSP selection ignore implications of DR laws.

Additionally, entities host multiple applications that are different from each other. These applications may differ in compute demand, type of data processed (for example: financial data, health data, personal data) and/or QoS requirement. Further, the preference given to a selection criteria for selecting CSPs may vary across applications. For example, security is more important in certain applications than others. Said differences may lead to a situation where different CSP combinations are top-ranked for different applications. However, in reality, entities operate on a budget. Hence, it might not be always possible to accommodate the top-ranked CSP combination for each application in the given budget. Thus, budget constraints also present a challenge in selecting the best CSP combination for each application.

Various embodiments disclosed herein provides methods and systems for selection of optimal CSPs in a multi-cloud environment. In an embodiment, the disclosed method provides for mufti-criteria mufti-cloud ranking and selection problem in a holistic way. For example, the disclosed method provides ranking the CSP combinations using MCDM techniques, and selecting the best combination for each entity application such that the cost budget is not exceeded. In an embodiment, the disclosed method provides for solving two decision problems, namely, VM selection and CC selection, in that order for each application and CSP combination, by taking latency requirement and DR laws into consideration. By solving the VM selection and CC selection problems, the disclosed method obtains estimates of the service cost and the user to CC mapping. Using aforementioned estimates and other qualitative criteria, a multi-cloud multi-criteria decision problem is solved using known MCDM techniques that may further be utilized to rank the CSP combinations based on the needs of an application. Considering the ranks and cost budget, a decision problem is solved to select the best CSP combination for each application.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 6E, where similar reference characters denote corresponding features consistently throughout the figures, there are shown preferred embodiments and these embodiments are described in the context of the following exemplary system and/or method.

FIG. 1 illustrates an example network implementation 100 of a system 102 for CSP selection in a multi-cloud environment in accordance with an example embodiment. In an embodiment, the system 102 facilitates CSP selection in a multi-cloud environment to serve multiple applications of an entity considering multiple criteria and DR laws.

In an embodiment, the system 102 receives input data for selection of CSPs in the multi-cloud environment. The input data may further be utilized for monitoring the system 102, as will be described later in the description. In an embodiment, the input data may include CSP registry data, an entity registry data and data residency (DR) registry data.

In an embodiment, the CSP registry data includes the data pertaining to the details of all cloud service providers in the multi-cloud network. Examples the said data may include, but are not limited to, CSP names, Cloud Region locations (Latitude and Longitude), Virtual Machine Specifications (Price, Memory, Disk Space, and so on), SLA and Latency. The CSP registry data may be extracted by using, for example, CSP APIs, Web crawlers, expert surveys and reports. In an embodiment, the CSP registry data may be accessed by VM Selection, Cloud center selection and criteria computation functionalities for decision making. The CSP registry data may also be utilized for monitoring/ tracking the changes in CSP details, as will be described later in the description.

In an embodiment, the entity registry data includes the data containing the details of the entity. The entity registry data may be collected from resources, including but not limited to, budget, contracts with CSP and certain details for each application. Said details may include, but are not limited to, application name, resources needed (storage/ virtual machines, and so on), data type (personal/finance/ health), data tagging and sensitivity information, security requirement, confidentiality, relative importance of criteria, user center locations (latitude and longitude, country, continent), user center demand (memory, disk space, and so on), latency guaranteed to users, and so on. In an embodiment, the entity registry data may be extracted by using entity APIs, annual reports, financial reports and SLAs with users, and so on. The entity registry data may be accessed for VM Selection, Cloud Center Selection and Cloud Selection functionalities for decision making. The entity registry data may also be used for monitoring/tracking the changes in entity requirements.

In an embodiment, the DR registry data includes the data pertaining to Data Residency related regulations. The DR data is collected from application dependent DR laws and penalties that are mandated by various governments, privacy law institutes and unions. The DR registry data also includes record of DR related decisions that are yet to be finalized/ passed by a constituency. The DR registry data may be collected from data privacy/security documents, reports and media coverage (news articles, blogs and so on). In an embodiment, the DR registry data is accessed by Cloud Center Selection model for selecting the cloud regions (or cloud centers) such that DR laws are not violated. The DR registry data is also used for monitor and tracking the changes in DR laws.

In an embodiment, the system 102 collects and maintains/updates the input data including the CSP registry data, the entity registry data and the DR registry data. The system 102 further utilizes the collected input data to select the best cloud service provider combination for meeting the requirements of an entity.

In order to select the CSP combination for meeting entity requirements, the disclosed system 102 solves a VM selection problem and a CC selection problem using an optimization model and an exact algorithm, respectively. The system 102 solves the problem of CSP selection with budget restriction for an entity that hosts multiple applications using an optimization model.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 2-5.

Figure 2:
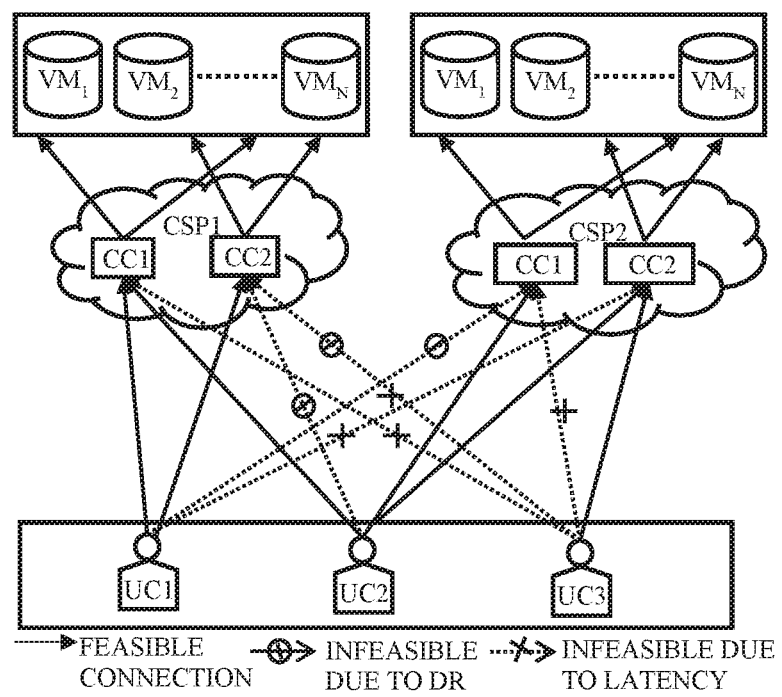
FIG. 2 illustrates an example multi-cloud environment for CSP selection in accordance with an example embodiment.

FIG. 2 illustrates an example multi-cloud network 200 for selection of CSPs, in accordance with various embodiments of present disclosure. The multi-cloud network is described by considering a multinational entity that may offer multiple independent applications to users. Said users may be present in different regions around the world; such regions may be referred to as User Centres (UCs). The entity needs compute nodes to process the user requests that an application receives. These nodes (VMs) are offered by different CSPs at competitive prices. Further, many CSPs have CCs in different regions of the world. To select the best CSP or a CSP combination for hosting an application, the VM selection problem and the CC selection problems are to be solved. Herein, the 'best' CSP combination may refer to a most optimal selection of the CSP or a combination thereof for accessing an application in a manner considering multiple criteria, DR laws and cost criterion at an entity level.

In an embodiment, the selection of optimal CSPs in the example multi-cloud 200 is performed by the system 102 (FIG. 2). In an embodiment, the multi-cloud 200 is accessed for the selection of the most optimal CSP or a CSP combination for accessing an application by the UC, at 302. In an embodiment, the system 102 may access the multi-cloud 200 for the selection of the most optimal CSP or a CSP combination for accessing an application by the UC.

Referring to the example of FIG. 2, two decision problems, namely VM selection and CC selection, are to be solved for selection of the optimal CSP(s) in the multi-cloud 200. The multi-cloud 200 shown in FIG. 2 is shown to include two CSPs (CSP1 and CSP2). Each CSP has two cloud centres (CC1 and CC2). Each CC consists of m VMs, which differ in their specifications and cost. We also display three different UCs (UC1, UC2 and UC3). In the VM selection problem, the goal is to find the right type and count of VMs for a UC in a CC. Since compute demand varies from one UC to another, the VM selection problem is solved separately for each UC. The optimal cost computed from the VM selection problem is given as input to the CC selection problem. The CC selection problem is to find an optimal CC for each UC such that latency requirements and DR laws are met with minimal service cost. Each UC in FIG. 2 has to be assigned to one of the four CCs; however, only the assignments that are represented by solid lines are feasible. Infeasibility in assignment is due to latency requirement or/and DR laws. For example, UC1 should not be assigned to CC1 and CC2 of CSP 2 due to DR laws and latency requirements, respectively. Similarly, if UC3 is assigned to CC2 of CSP1, both DR and latency requirements are violated. The decision problems; namely the VM selection and CC selection; and the solution methodologies therefor are selected in detail in the description below.

Herein, it will be understood that for the purpose of explanation and brevity of description only, the example cloud of FIG. 2 is shown to include three UCs; two CSPs, each CSP having two CCs, and each CC capable of catering to a number of VMs. However, such an example should not be considered as limiting to the embodiments. In various other embodiments, the multi-cloud 200 may include more or fewer number of UCs, CSPs, CCs per CSPs and VMs.

At 304, method 300 includes obtaining, for a user center (UC), an optimal compute center (CC) from amongst a plurality of CCs associated with a plurality cloud service providers (CSPs). A method for obtaining the optimal CC is explained further in steps 306-310 of FIG. 3 that are performed, for each CSP of a plurality of CSPs and a plurality of CSP combinations of the plurality of CSPs.

As is understood, CSPs offer different types of VMs. The VMs differ from each other in hardware specifications such as memory, disk space, number of CPUs, processing speed and so on. Moreover, the cost of VMs varies depending on the VM power (high-power VMs costing higher than low-power VMs) and CC location (VMs with the same hardware and software specification may have different cost at different CCs). Selection of VMs for an application that is to be accessed by a UC is a challenging task, as described below with reference to an example.

In an example scenario, consider that a cloud region offering four different types of VMs (namely, XL-VM, L-VM, M-VM, and S-VM). Example specifications of these VMs are shown in Table I.

TABLE 1

Sample VM Specifications

| Specifications | XL-VM | L-VM | M-VM | S-VM |
|---|---|---|---|---|
| Disk Space (GB) | 1690 | 850 | 410 | 160 |
| RAM (GB) | 15 | 7.5 | 3.75 | 1.7 |
| Cost ($/hr) | 3.04 | 1.461 | 0.7 | 0.33 |

As an example, if the compute demand of an entity UC is considered to be 10000 GBs of CPU and 100 GBs of RAM. If the entity uses only one type of VM for satisfying the user demand, then it would need seven units of XL-VMs (cost=$21.28/hr), 14 units of L-VMs (cost=$20.45/hr), 27 units of M-VMs (cost=$18.9/hr), or 59 units of S-VMs (cost=$19.77/hr). However, if the entity uses 24 units of M-VMs and six units of S-VMs, the cost would be $18.81/hr. Clearly, to reduce service cost, using multiple VM types is preferred over a single VM type. Thus, determining the optimal VM types and count according to entity user needs is a challenging combinatorial optimization problem.

Figure 3:
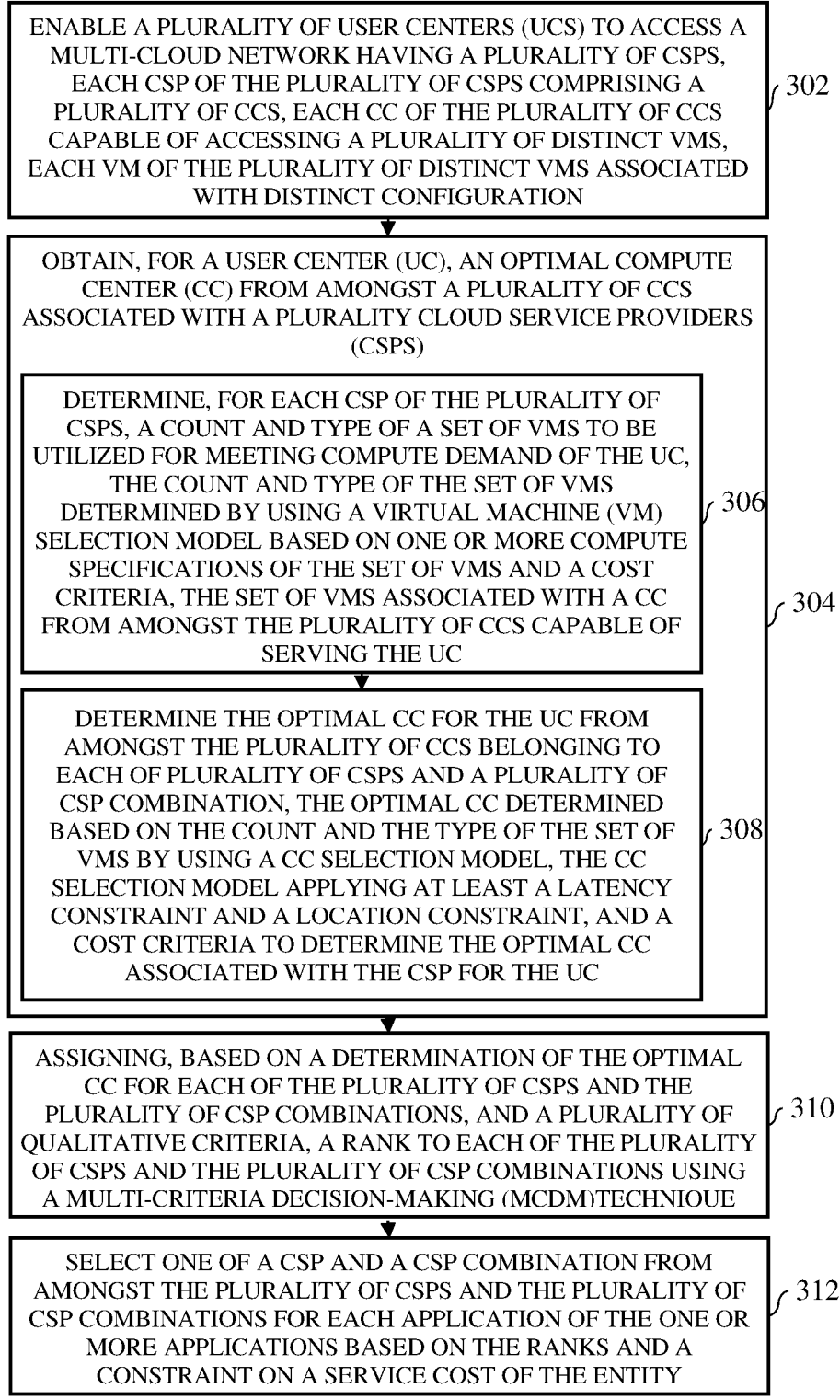
FIG. 3 illustrates a flow-diagram of a method for CSP selection in a multi-cloud environment in accordance with an example embodiment.

In an embodiment, the system 102 handles the problem of VM selection by using a VM selection model. For each CSP of the plurality of CSPs, the VM selection model determines a count and type of a set of VMs to be utilized for meeting compute demand of the UC for the application based on one or more compute requirements of the set of VMs and the compute demand of the UC, at 306 (FIG. 3). In an embodiment, the VM selection model applies at least a cost criteria for determining the count and type of the set of VMs. The VM model is modeled as a integer linear program. Herein, it is assumed that all the users in a UC are served using the VMs from a single CC.

A UC indexed with i and a CC indexed with j are considered. Let set $V_j$ represent the different types of VMs in CC j. The compute demand of UC i is modelled according to its memory ($M_i$) and disk space ($D_i$) requirement. It will be understood that the proposed integer program can be extended to other types of compute requirements, such as processing speed, number of cores and so on. Let $m_{kj}$ and $d_{kj}$ represent the memory and disk space available with VM type k in CC j. Let $c_{jk}$ denote the cost of a VM instance of type k in CC j. The non-negative integer decision variable $x_{ijk}$ indicates the number VMs of type k to be deployed in CC j to serve users in UC i.

Herein, the objective of the integer program is to minimize the overall service cost as shown in equation 1.

$$C_{ij}^v = \min \Sigma_{cjk} x_{ijk} \quad (1)$$

Constraints 2 and 3 below represent memory constrain and disk space constraint. The memory constraint and the disk space constraint ensures that the memory requirement and disk space requirement of UC i is satisfied by serving CC j $$\Sigma_{k \in v_i} m_{jk} x_{ijk} \geq M_i. \quad (2)$$

$$\Sigma_{k \in v_i} s_{jk} x_{ijk} \geq S_i. \quad (3)$$

Constraint 4 is the bound for decision variable $x_{ijk}$.

$$x_{ijk} \in Z \geq 0 \quad (4)$$

For small to medium size instances, the problem can be solved to optimality using commercial solvers such as, but not limited to, CPLEX and Gurobi.

The optimization model, i.e. VM selection model discussed facilitates the system 102 in selecting the type and count of VMs in a CC associated with a given CSP to host an application for a UC at 306. The system 102 may further determine that CC of the given CSP that is best-suited for the UC. As the VM cost varies across CCs, an optimal CC is to be selected that can serve the user centers with minimal cost. Further, various other criteria to be considered includes: a) Latency requirement: Latency experienced by the users from the serving CC should be below a certain threshold value and b) DR laws: DR laws do not allow the data of users residing in certain UCs to be stored and/or processed in some CCs.

In accordance with the aforementioned, the goal of the CC selection optimization is to select a CC for a UC from the CCs of a given CSP, such that latency requirements are satisfied, DR laws are obeyed, and overall cost is minimum.

In an embodiment, an optimal CC for the UC is determined from amongst the plurality of CCs belonging to each of plurality of CSPs and a plurality of CSP combination at 308. The optimal CC is determined based on the count and the type of the set of VMs by using a CC selection model. The CC selection model applies at least a latency constraint and a location constraint, and a cost criteria to determine the optimal CC associated with the CSP for the UC. Herein, the location constrain may include, for example DR laws constraint since DR laws are specific to particular location or jurisdiction. An exact algorithm for finding the optimal CC for each UC is described below.

Considering a UC i with $\bar{L}$ as the maximum allowed latency, let $l_{ij}$ be the latency between UC i and CC j. Let $\alpha_{ij}$ be $\alpha_{ij}$ binary parameter which takes value 1, if DR laws allow both processing and storing of $i^{th}$ UC's data in $j^{th}$ CC. Optimal CC j* for UC i is, $$j^* = \operatorname{argmin}_{j \in S} \{C_{ij}^v : l_{ij} \leq \bar{L} \text{ and } \alpha_{ij} = 1\} \quad (5)$$

where S is the set of CCs where a CSP operates.

$C_{ij}^v$ is the VM cost computed in Equation (1).

If there does not exist any CC that meets both latency and DR requirements, the entity has to pull out of that UC, which leads to loss in business. To avoid loss in business, the entity can adopt a multi-cloud model where different UCs are served by CCs of different cloud providers. The multi-cloud model also provides other advantages such as reduced cost and better latency to users. The optimal CC j* for UC i in a multi-cloud model is computed (similar to equation 5) as shown in equation 6:

$$j^* = \operatorname{argmin}_{j \in u_{i=1}^t S_i} \{C_{ij}^v : l_{ij} \leq L \text{ and } \alpha_{ij} = 1\} \quad (6)$$

where $S_1, S_2, \ldots, S_t$ are the set of cloud regions of the t cloud providers considered in the multi-cloud environment.

To estimate the cost (sum of service cost to serve all UCs=$\Sigma_{i=1}^{|U|} C_{ij^*}^v$ where |U| is the number of UCs and j* is the optimal CC for UC i), latency (sum of latency experienced by all UCs=$\Sigma_{i=1}^{|U|} l_{ij^*}$) and loss in business (number of UCs which could not be served) in a single cloud as well a multi-cloud environment. Apart from these quantitative criteria, there are several qualitative criteria that an entity needs to consider while selecting the CSPs. Some of the crucial qualitative parameters include security, manageability, and usability. In an embodiment, the aforementioned qualitative criteria are computed for a multi-cloud environment, as described below in further detail.

Security: The security criterion indicates the resistance level of a CSP to cyberattacks, data breaches, and compliance to security laws. The security level of a CSP is measured on a scale of 1 to 10, with 1 being poor security and 10 being high security. In a multi-cloud environment, since the CSP with least security is the weakest link, security of the combined system is computed as the minimum of security levels of individual CSP, as shown in equation 7:

$$E_N = \min_{i \in N} E_i \tag{7}$$

In this equation, N is the set of CSPs in the multi-cloud environment, $E_i$ is the security level of CSP i and $E_N$ is the security level of the multi-cloud system.

Usability: The usability criterion indicates the level to which the features offered by a cloud provider can be learned and used by an entity. The usability level of a CSP is measured on a scale of 1 to 10, with 1 being low usability and 10 being high usability In a multi-cloud environment, since entities use features from all the CSPs, usability of the combined system is computed as the average (weighted by the number of UCs served by each CSP) of usability of individual CSPs, as shown in equation 8:

$$B_N = \frac{\sum_{i \in N} \beta_i B_i}{\sum_{i \in N} \beta_i} \tag{8}$$

In equation (8), N is the set of CSPs in a multi-cloud environment, $\beta_i$ is the number of UCs served by CSP i, $B_i$ is the usability of CSP i and $B_N$ is the usability of the multi-cloud system.

Manageability: The manageability criterion indicates the difficulty level for an entity in managing the multi-cloud system. With an increase in the number of CSPs, the management difficulty increases. The manageability criteria is calculated as shown in equation 9.

$$G_N = |N| \tag{9}$$

In this equation, N is the set of CSPs in the multi-cloud environment and $G_N$ is the management level of the multi-cloud system.

As already discussed, the system 102 is capable of ranking the CSP combinations for a single application. In an embodiment, the rank may be assigned by using a multi-criteria decision-making (MCDM) technique at 310. An example of the MCDM is Technique for Order of Preference by Similarity to Ideal Solution (TOPSIS). Various other MCDM techniques that can be utilized for ranking the CSP combinations may include, but are not limited to, AHP, VIKOR, PROMETHEE, and so on.

In practice, there could be multiple independent applications hosted by an entity. These applications typically differ in compute demands of UCs, type of data processed and associated DR laws and importance of selection criteria. For example, security is more important in certain applications than others. One can use our proposed methodology to select CSPs (top-ranked CSP combination) for each application independently.

However, this selection is influenced by the cost budget enforced by the entity. Due to this budget constraint, it might not be possible to serve all the cloud applications by their top-ranked CSP combination. Hence, the decision problem is to select the best ranked CSP combination for each cloud application such that the budget is not violated. In an embodiment, the selection of the best ranked CSP combination for each cloud application is modelled as an integer linear optimization problem. At 312, one of a CSP and a CSP combination from amongst the plurality of CSPs and the plurality of CSP combinations are selected for each application of the one or more applications based on the ranks and a constraint on a service cost of the entity, as described below.

Let P and p represent the set of entity applications and $q^{th}$ application, respectively. Let Q and q represent the set of CSP combinations and qm application, respectively. $r_{pq}$ is the rank of CSP combination q for application p, which is calculated using the ranking methodology described previously. $S_{pq}$ is the service cost paid to CSP combination q if application p is hosted by q, which is calculated as described previously. Let $y_{pq}$ be a binary decision variable in the optimization model with $y_{pq}=1$ if CSP combination q is used to host application p; 0 otherwise. Since each application prefers to be served by its top-ranked CSP combination, the objective of the optimization model is to minimize the sum of ranks of CSP combinations assigned to the applications, as shown in equation (10).

$$\min \Sigma_{p \in P}, \Sigma_{q \in Q} r_{pq} y_{pq} \tag{10}$$

Constraint 11 ensures that an application is hosted by exactly one of the cloud combinations:

$$\Sigma_{q \in Q} y_{pq} = 1 \forall_p \in P \tag{11}$$

Constraint 12 ensures that the total service cost of the applications does not exceed the entity budget (S).

$$\Sigma_{p \in P} \Sigma_{q \in Q} y_{pq} s_{pq} \leq S \tag{12}$$

Constraint 13 assigns the bounds to the decision variables:

$$y_{pq} \in \{0,1\} \forall_p \in P, q \in Q \tag{13}$$

This optimization model can be solved using commercial solvers such as CPLEX and Gurobi.

In an embodiment, the system 102 may monitor changes, if any, in the multi-cloud and take reactive steps to address said changes. Some of the potential runtime changes in the multi-cloud are described in detail in the description below.

In an example scenario, the changes in DR laws may be triggered by respective Governments. For instance, Governments regularly update the DR laws related to storing/processing the data of citizens of their country. These laws vary depending on type of data (personal/health/finance) and usage. Said functionality helps the entities to monitor the change in DR laws and take appropriate actions to maintain compliance with the laws. In an embodiment, the system 102 may receive a notification regarding the changes in DR laws, via DR registry data. The Change in DR laws functionality may call the Cloud Center Selection functionality, which in turn selects the best cloud centers such that new DR laws are not violated. Upon selecting the cloud centers, new VMs may be instantiated and user centers may be served from the new cloud centers.

In another example scenario, CSPs may change VM Prices and/or introduce new VMs for cloud computation. The Change in VM Prices functionality may help the entity to monitor the change in VM prices and update their cloud VM configuration (type and count of VMs deployed). In an embodiment, upon receiving a notification based on the CSP registry data about the change in VM prices, the system 102 (configured with a change in VM Prices functionality) calls the VM Selection functionality, which in turn selects the best VM configuration such that the user demands (at UCs) are satisfied at minimal service cost. After selecting the VM configuration, the entity may either choose instantiate the new VM configuration in the existing cloud center or proceed for cloud center selection.

In yet another example scenario, there may be a change in demand. For instance, the compute demand of entity user may change (increase or decrease) with time. The VM configuration needs to be scaled up/down to optimize the running cost and user compute experience. Change in Demand functionality helps the entities to monitor the change in user demand and update their VM configurations. In an embodiment, the system 102, upon receiving a notification from based on the Entity Registry data, regarding the change in user demand, may call the VM Selection model, which in turn may select the best VM configuration such that the user demands are satisfied at minimal service cost. After deciding the VM configuration, the entity may either select to instantiate the new VM configuration in the existing cloud center or proceed for cloud center selection.

In still another example scenario, there may be a change in budget. For example, the budget allocated by an entity for paying the cloud service providers may change with time. Since cloud selection depends on the budget, change in Budget functionality may enable the entity to update their cloud selection for the changed budget. In an embodiment, the system 102 may, upon receiving a notification based on the entity registry data, about the change in budget, call the Cloud centre Selection model, which may in turn select the best cloud provider combination for each application hosted by the entity.

In still another example scenario, change in QoS requirements of entity users may change. Change in QoS Requirements functionality of the system 102 may help the entities to monitor the change in QoS requirements and take appropriate actions to meet the requirement. In an embodiment, the system 102, upon receiving a notification based on the entity registry module, about the changes in QoS requirement, calls the Cloud Center Selection functionality, which in turn selects the best cloud centers such that new QoS requirements are met. Upon selecting the cloud centers, new VMs are instantiated and user centers are served from the new cloud centers.

In still another example scenario, CSPs may introduce new data centers at different regions around the world. New Cloud Center functionality may help in monitoring the introduction of new data centers and take appropriate actions to make use of the new data centers. In an embodiment, upon receiving a notification from the CSP Registry about the new cloud centers, the system 102 may calls the VM selection model, which in selects the best VM configuration in the new cloud centers such that the user demands are satisfied at minimal service cost. After deciding the VM configuration, the entity can either instantiate the new VM configuration in the new cloud centers or proceed for cloud center selection.

Still further in an example scenario, new CSPs may enter the cloud market at a regular basis. Since the new CSPs propose attractive and competitive services, an entity would consider the possibility of using some of the services offered by the new service providers. The system 102 may help the entity to decide the right combination of CSPs (combination of old and new CSPs) for hosting their web applications. In an embodiment, the system 102, upon receiving a notification based on the CSP Registry data about the new CSPs, may call the VM Selection model, which in turn selects the best VM configuration in the cloud centers of new CSPs such that the user demands are satisfied at minimal service cost. After deciding the VM configuration, the entity proceeds with cloud selection, criteria computation, cloud ranking and cloud selection.

Another example scenario may be related to new application requirement. As is known, the entities may provide new applications to their users. The system 102 may help the entity to select the best combination of CSPs for their new application. In one embodiment, upon receiving a notification based on the entity registry data about the new application, the system 102 may call the VM Selection model, which in selects the best VM configuration in the cloud centers for the new application such that the user demands are satisfied at minimal service cost. After deciding the VM configuration, the entity proceeds with cloud selection, criteria computation, cloud ranking and cloud selection.

Figure 4:
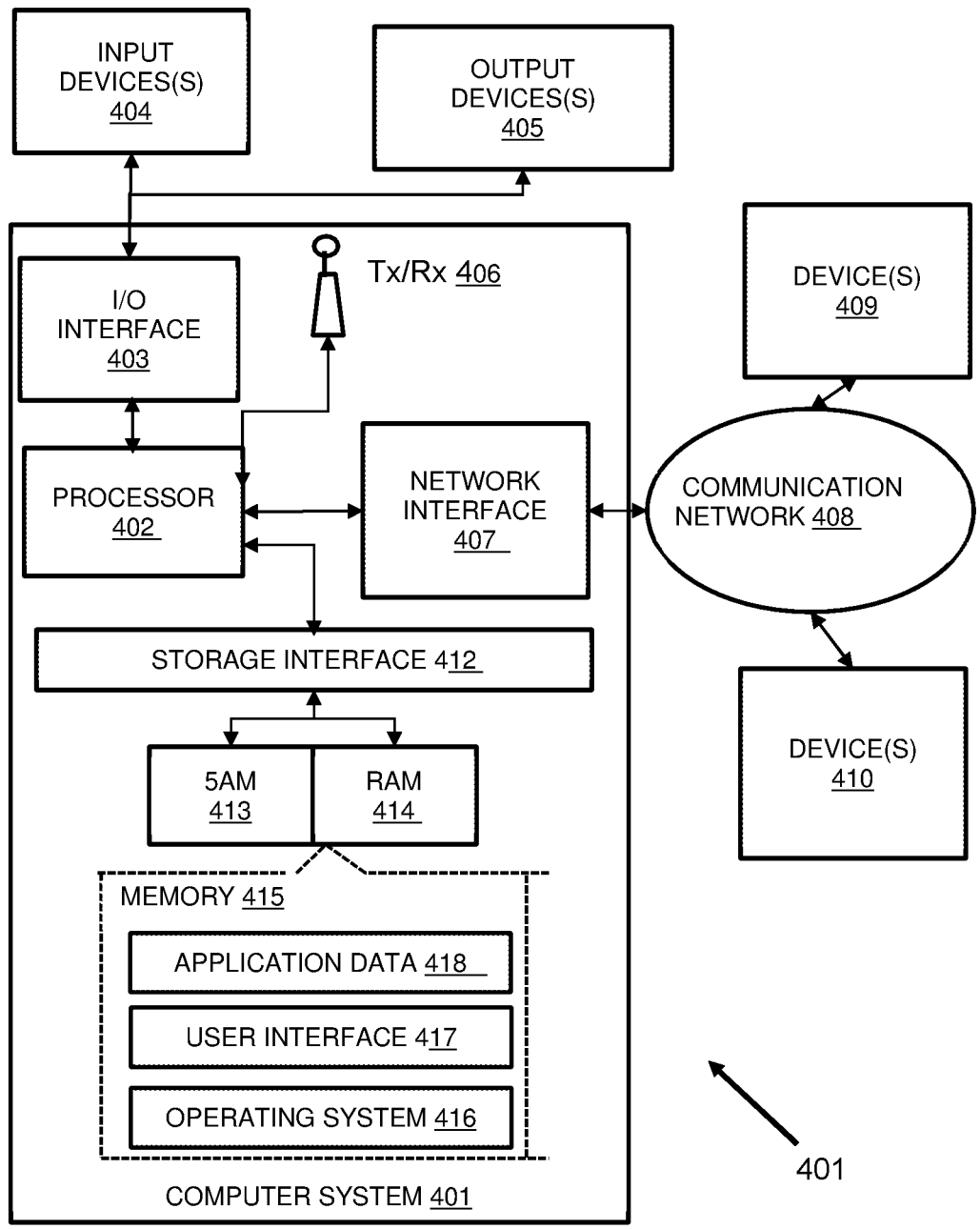
FIG. 4 illustrates a block diagram of an exemplary computer system for implementing embodiments consistent with the present disclosure.

FIG. 4 is a block diagram of an exemplary computer system 401 for implementing embodiments consistent with the present disclosure. The computer system 401 may be implemented in alone or in combination of components of the system 102 (FIG. 1). Variations of computer system 401 may be used for implementing the devices included in this disclosure. Computer system 401 may comprise a central processing unit ("CPU" or "hardware processor") 402. The hardware processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 402 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 402 may be disposed in communication with one or more input/output (I/O) devices via VO interface 403. The VO interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/ source, visors, etc.

Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WILink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409 and 410. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 416, user interface application 417, user/application data 418 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 401 may store user/application data 418, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

An example scenario illustrating experimental results for a method of selection of CSPs in a multi-cloud are described further in the description.

Example Scenario:

Referring collectively to FIGS. 5A-5E, experimental results for an example scenario for CSP selection in a multi-cloud environment are illustrated in accordance with an example embodiment. In the present example scenario, an example data generation procedure is described for the experiments, and further a detailed analysis of the disclosed method is provided. The VM selection optimization problem was modeled and solved using PuLP and CBC, respectively, in Python 3.7. Additionally, TOPSIS is implemented in Python. All the experiments were carried out on a machine equipped with Windows 10 OS, Intel i7 1.9 GHz processor and 16 GB RAM.

For data generation, synthetic representative data was generated for experiments. The data generation procedure is as follows.

User Center Location: 50 UCs were considered. Since UCs are spread across different countries, in the experiments, a 15×15 square layout was considered, and 50 grids were randomly (uniform distribution) selected as UC locations.

User Center Requirement: Required memory ($M_i$) for each UC was randomly selected between 600 and 1200 GBs. Required disk space ($S_i$) for each UC was randomly selected between 200 and 2000 GBs.

Cloud Center: Four CSPs were considered. Popular CSPs such as AWS, Azure and Google have CCs at many regions and local CSPs have CCs at fewer regions. Hence, the number of CCs for each CSP was randomly considered in the range between 8 and 40. Grids were chosen randomly from the above mentioned 15×15 layout for the CCs.

DR Laws: 50% UCs were randomly selected for enforcing DR laws. For each DR-enforced UC, the condition was enforce that it could be served only by the CCs that are either adjacent to the UC or within the UC.

Latency: Latency between a cloud region and a user center was proportional to the distance (Euclidean) between them.

VM Configuration: Memory for a VM was randomly selected from {2, 4, 8, 16, 32, 64, 128, 256, 512, 1024} GBs. Similarly, disk space for a VM is randomly chosen from {20, 40, 80, 160, 320} GBs. For each cloud provider, we randomly generated 25 to 45 different VM configurations. These values are based on the VM configurations offered by a popular CSP.

VM Price: The price of VMs was modelled based on the pricing scheme of popular CSPs such as AWS and Azure.

Ranking CSP Combinations: Since four different CSPs were considered in the experiments, there were 15 possible cloud combinations. For each cloud combination, Table II (FIG. 5A) shows the service cost, latency, coverage, management complexity, security and usability. Coverage was computed as the difference between the total number of UCs (50) and the number of UCs that could not be served due to latency requirement and DR laws. The last two columns in the table display the closeness coefficient and ranks obtained from TOPSIS. Findings from this analysis are as follows:

CSP combinations {2, 3}, {2, 4}, and {1, 2} are ranked 1, 2 and 3, respectively; whereas, single CSP {1}, {2}, {3}, and {4} are ranked 12, 8, 14 and 13, respectively. CSP combinations with two or more CSPs have better ranks compared to combinations with one CSP. Multi-cloud is preferred over single cloud because:

Multi-cloud provides higher coverage (owing to increase in availability of CCs that can satisfy DR and latency requirements) than single cloud.

Multi-cloud can serve the UCs with lower service cost single cloud.

CSP combinations comprising of three or more CSPs (Example: {1, 2, 3} and {1, 2, 3, 4}) are ranked lower than the combinations with two CSPs (Example: {2,3} and {2,4}). This is mainly due to the increase in cloud management complexity with increase in the number of CSPs.

Multi-clouds {2,3}, {2,4} and {1,2} have the best ranks among all the CSP combinations and {2,3} marginally beats (see closeness coefficient) the other two. Since {2,3} provides good security and usability along with high coverage at a lower cost, this CSP combination is ranked the highest. Interestingly, cloud provider 2 is best ranked and cloud provider 3 is worst ranked among the four cloud providers. These two contrasting CSPs together provide the best service for the entity.

Implications of DR Laws: Implications of DR laws was studied in CSP selection. Tables II (FIG. 5A) and III (FIG. 5C). Note: management complexity, security and usability remain same as in table II) show the CSP ranking with and without DR laws, respectively.

It was observed that without DR, the ranks of CSPs {1}, {2}, {3} and {4} are 6, 7, 13 and 15, respectively; whereas, with DR, the ranks are 12, 8, 14 and 13. This shows that consideration of DR changes the ranks of cloud providers.

Without DR, the ranks of CSP combinations {1}, {2}, {3}, {4}, {1, 3, 4}, {2, 3, 4} and {1, 2, 3, 4} are 8, 10, 11, 9, 12; whereas, with DR, the ranks are 5, 4, 10, 6 and 8. This shows that multi-cloud is the preferred choice when DR laws are taken into consideration.

Implications of Change in Latency Threshold: The effect of changing the latency threshold on cost, latency, coverage and CSP combination ranks was observed. Table II (FIG. 5A) and Table III (FIG. 5C) shows the results for latency threshold 3 and 4, respectively. With the increase in latency threshold, user coverage (column 8 in Table III) increases but the ranks have remained almost intact. In CSP combination {2,3}, the coverage has increased from 40 to 41, but, intriguingly, the cost has reduced from $68,357 to $67,336. The reason for this decrease in cost is illustrated through FIG. 5B.

Figure 5B:
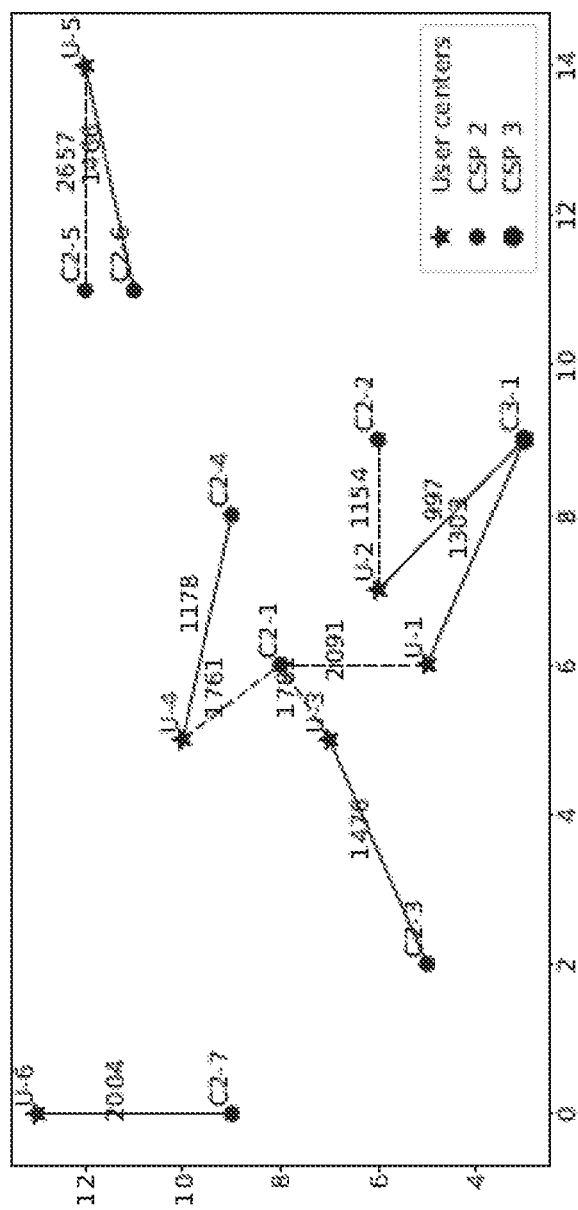

FIG. 5B shows some of the cloud centers of two CSPs. The figure shows seven CCs (C2-1, C2-2, . . . , C2-7) of CSP 2. C2-1 represents CC 1 of CSP 2. Similarly, the figure also shows one CC (C3-1) of CSP-3. Six UCs (U-1, U-2, . . . , U-6) are displayed. Dashed lines and solid lines indicate the user center to cloud center mapping for latency threshold 3 and 4, respectively. Service cost for a UC (say U-5) assigned to a CC (say C2-5) is indicated by the value mentioned near the line (2657) joining them. With the allowable change in latency threshold, it was observed:

Intra-cloud Transfer: UC U-5 is reassigned to C2-6 from C2-5. This change has happened because the service cost is lower (as indicated by the cost values mentioned in the figure) in C2-6 than C2-5.

Inter-cloud Transfer UCs U-1 and U-2 are reassigned to a different CSP (CSP 3).

Increase in Coverage: UC U-6, which earlier could not be assigned to any CC due to low latency threshold, is now served by C2-7.

Implications of Entity Budget: The budget limitations could critically impact the selection of CSPs. For demonstrating the implications, three distinct applications were considered: Application 1 (referred as App 1) prefers CSPs with high security value, application 2 (referred as App 2) prefers CSPs with high usability value and application 3 (referred as App 3) prefers CSPs with high value for both security and usability. Table IV (FIG. 5D) shows the cost, coverage and TOPSIS rank of each of the CSP combination for the three applications. Data for these applications was generated using the procedure explained previously. Since the compute demand differs across these applications, the service cost varies for the same cloud combination from one application to another. Also, the ranks of CSP combinations vary across the applications due to the difference in criteria preference of applications. For App 1, the CSP combination {1, 2} is ranked 1 with service cost $87,529. Similarly for App 2 and App 3, CSP combination {2, 3} is ranked 1 with cost $88,826 and $85,197, respectively. Thus, the entity has to spend approximately a total of $262 k as service cost, if the top-ranked CSP combinations are selected for serving these applications.

Table IV (FIG. 5D) displays the solution obtained, that is the CSP combinations selected with varying budget restrictions. It also displays the TOPSIS rank and coverage of the selected CSP combination.

When budget is low, CSP combinations with lower ranks (9, 7 and 13, respectively, for the three applications) are selected since the low-ranked single CSP combinations have lower cost (due to lesser coverage) than other high-ranked multi CSP combinations.

As the budget increases, high-ranked CSP combinations are selected. These combinations contain more than one CSP. For example, when the budget is $260 k, CSP combinations {1,2}, {2,4} and {2,3} with TOPSIS ranks 1, 3 and 1, respectively, are selected for the three applications. Also, the customer coverage increases with higher budget. Similar results are obtained by increasing the budget to $262 k, where all top ranked CSPs are selected.

Notably, as the budget varies, the entity needs to negotiate contracts with multiple CSPs. For example, when the budget is $210 k, the entity has to make contracts with only two CSPs (f1g and f2g); whereas, when the budget is $260 k, the entity has to make contracts with all four CSPs. Hence, if the entity wants to reduce the CSP management complexity, additional constraints have to be added to the selection optimization model that puts an upper bound on the number of different CSPs that could be selected.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for CSP selection in a multi-cloud environment to serve multiple applications of an entity considering multiple criteria and DR laws. In an embodiment, VM selection and CC selection problems are solved using an optimization model and an exact algorithm, respectively. Moreover the disclosed method provides for solving the problem of CSP selection with budget restriction for an entity that hosts multiple applications using an optimization model.

In an embodiment, the CC selection takes location of CC into consideration while selecting the optimal CC for the CSP. The location of the CC is an important criteria since the operation of the CC is governed by the DR laws that may be introduced or existing DR laws are updated regularly by the governments. For example, due to change in DR Laws, new VMs may be introduced and/or the price of existing VMs may be changed. Every time a change is made, the ranks of CSP combination might alter. However, an entity might not want to change the CSP combinations regularly due to the overhead charges. However, the entity might still optimize the coverage and service cost, by using the VM selection model and CC selection algorithm for choosing the best VMs (considering the new VM cost) and CCs (considering the updated DR laws and VM cost) within the CSP combination which is already serving the entity.

Scalability of the Methodology: The bottleneck to computational time in the proposed methodology is VM selection, which is NP-Hard. However, the entity does not have to solve the VM selection problem for all the CSPs combinations, but rather solve it once for each CC belonging to a CSP. Optimal VM configuration obtained for each CC will also be optimal in the multi-cloud combination, since the VMs are chosen independently for each UC and a UC is served only by one CC. Hence, the disclosed method is scalable and can solve large-sized problems consisting of many CSPs.

Multi-cloud offers various advantages to entities including high user coverage, good QoS and low service cost. Various embodiments proposes a comprehensive methodology for selection of CSPs in a multi-cloud environment considering various qualitative and quantitative criteria. The disclosed method also selects the best VMs and CCs to serve the entity users. Mile selecting the CCs, it is ensured that latency requirements and DR laws are met. An integer programming is utilized to solve the VM selection problem and an exact algorithm to select the CC selection problem. By solving these decision problems, service cost, latency, and coverage are obtained. These values, along with other criteria such as security, usability, and manageability, are used to rank the CSP combinations using TOPSIS. Further, considering these ranks, the best CSP combination is selected for each application without exceeding the cost budget (FIG. 5E). Results show that multi-cloud is preferred over single cloud provider. However, the multi-cloud with popular top-ranked CSPs is not necessarily the best combination for entity requirements. The combination of local (lower ranked CSPs) and global CSPs could efficiently serve entity users. As management complexity increases with an increase in the number of CSPs in the multi-cloud, CSP combinations with fewer CSPs are preferred. The results, where considered four CSPs were considered, shows that combinations with two CSPs are better than combinations with three or more CSPs. It was also demonstrated through experiments the implications of DR laws and change in latency threshold. With the inclusion of DR laws, a single CSP may not be able to serve the users efficiently. Hence, multi-cloud is preferred. By increasing the latency threshold, an entity could reduce the service cost significantly and increase the UC coverage, without drastically affecting the QoS of users.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:

enabling, via one or more hardware processors, a plurality of user centers (UCs) to access a multi-cloud having a plurality of Cloud Service Providers (CSPs), each CSP of the plurality of CSPs comprising a plurality of compute centers, each compute center of the plurality of compute centers capable of accessing a plurality of distinct virtual machines (VMs), each VM of the plurality of distinct VMs associated with distinct configuration, wherein the plurality of UCs accesses the multi-cloud to access one or more applications associated with an entity;

obtaining, for a user center (UC) from amongst the plurality of UCs, an optimal compute center from amongst the plurality of compute centers associated with the plurality cloud service providers (CSPs), via one or more hardware processors, wherein obtaining the optimal compute center comprises:

determining, for each CSP of the plurality of CSPs, a count and type of a set of VMs to be utilized for meeting compute demand of the UC, the count and the type of the set of VMs determined by using a virtual machine (VM) selection model based on one or more compute requirements of the set of VMs and a cost criteria, the set of VMs associated with a compute center from amongst the plurality of compute centers capable of serving the UC, wherein the cost criteria facilitates in determining a consolidated cost associated with serving the UC based on the determination of the count and the type of the set of VMs, wherein the cost criteria comprises minimizing service cost associated with the selection of the set of VMs, as shown in the equation below:

$$C_{ij}^v = \min \sum_{c_{jk}^p} x_{ijk}$$

where, $c_{jk}^p$ denotes the cost of a VM instance of type k in CC j, and $x_{ijk}$ is a non-negative integer decision variable; and determining the optimal compute center for the UC from amongst the plurality of compute centers belonging to each of plurality of CSPs and a plurality of CSP combinations by using a compute center selection model, the compute center selection model applying at least a latency constraint, a location constraint and the consolidated cost to determine the optimal compute center associated with the CSP for the UC;

assigning, based on a determination of the optimal compute center for each of the plurality of CSPs and the plurality of CSP combinations, and a plurality of qualitative criteria, a rank to each of the plurality of CSPs and the plurality of CSP combinations using a multi-criteria decision-making (MCDM) technique, via the one or more hardware processors, wherein the plurality of qualitative criteria comprises at least a security criteria, a usability criteria and a manageability criteria, wherein the security criteria is indicative of a resistance level of a CSP to cyberattacks, data breaches, and compliance to security laws, wherein the usability criteria is indicative of a level to which the features offered by a cloud provider can be learned and used by the entity, and wherein the manageability criteria is indicative of a difficulty level for the entity in managing a multi-cloud, wherein the security criteria is computed as a minimum of security levels of a distinct CSP associated with one of the CSP and the CSP combinations using the equation below:

$$E_N = \min_{i \in N} E_i$$

where, N is the set of CSPs in the multi-cloud, and $E_i$ is the security level of CSP i and $E_N$ is the security level of the multi-cloud; and selecting, via the one or more hardware processors, one of a CSP and a CSP combination from amongst the plurality of CSPs and the plurality of CSP combinations for each application of the one or more applications based on the ranks and a constraint on a service cost of the entity.

2. The processor implemented method of claim 1, wherein the one or more compute requirements of the set of VMs comprises memory requirement, disk space requirement, processing speed, and number of cores, Computer processing Unit (CPU) compute power, Graphical Processing Power, one or more softwares, and an Operating System (OS).

3. The processor implemented method of claim 1, wherein the optimal compute center for the CSP is determined based on the equation:

$$j^* = \mathrm{argmin}_{j \in u_{i=1}^t S_i} \{C_{ij}^v : l_{ij} \le L \text{ and } \propto_{ij} = 1\}$$

where, $S_1, S_2, \ldots, St$ are the set of cloud regions of the t CSPs considered in the multi-cloud.

4. The processor implemented method of claim 1, wherein the usability criteria is computed as the average weighted by the number of UCs served by each CSP of usability of the distinct CSPs, as shown in equation below:

$$B_N = \frac{\sum_{i \in N} \beta_i B_i}{\sum_{i \in N} \beta_i}$$

where,

N is the set of CSPs in the multi-cloud, $\beta_i$ is the number of UCs served by CSP i, $B_i$ is the usability of CSP l, and $B_N$ is the usability of the multi-cloud.

5. The processor implemented method of claim 1, wherein the manageability criteria is computed using the equation:

$$G_N = |N|$$

where,

N is the set of CSPs in the multi-cloud, and $G_N$ is the security level of the multi-cloud.

6. The processor implemented method of claim 1, further comprises:
  selecting, for each of the one or more applications hosted by the entity, a CSP combination from amongst the plurality of CSPs, and
  applying a constraint on a service cost and minimize a sum of the ranks of the CSP combinations selected for the one or more applications, based on the equations:

$$\min \sum_{p \in P} \sum_{q \in Q} r_{pq} y_{pq}$$

where, a constraint on an application hosted by one of exactly one CSP and CSP combination is given by the equation:

$$\sum_{q \in Q} y_{pq} = 1 \forall_p \in P$$

and where a total service cost of the applications constrained to be below an entity budget is given by the equation:

$$\sum_{p \in P} \sum_{q \in Q} y_{pq} s_{pq} \leq S$$

and, where a constraint to assign the bounds to the decision variables is given by the equation:

$$y_{pq} \in \{0,1\} \forall_p \in P, q \in Q.$$

7. A system comprising:
  one or more memories; and
    one or more hardware processors, the one or more memories coupled to the one or more hardware processors, wherein the one or more hardware processors are configured to execute programmed instructions stored in the one or more memories to:
  enable a plurality of user centers (UCs) to access a multi-cloud having a plurality of Cloud Service Providers (CSPs), each CSP of the plurality of CSPs comprising a plurality of cloud centers, each cloud center of the plurality of cloud centers capable of accessing a plurality of distinct virtual machines (VMs), each VM of the plurality of distinct VMs associated with distinct configuration, wherein the plurality of UCs accesses the multi-cloud to access one or more applications associated with an entity;
  obtain, for a user center (UC) from amongst the plurality of user centers, an optimal compute center from amongst the plurality of cloud centers associated with the plurality cloud service providers (CSPs), via one or more hardware processors, wherein to obtain the optimal cloud center the one or more hardware processors are configured by the instructions to:
    determine, for each CSP of the plurality of CSPs, a count and type of a set of VMs to be utilized for meeting compute demand of the UC, the count and the type of the set of VMs determined by using a virtual machine (VM) selection model based on one or more compute requirements of the set of VMs and a cost criteria, the set of VMs associated with a cloud center from amongst the plurality of cloud centers capable of serving the UC, wherein the cost criteria facilitates in determining a consolidated cost associated with serving the UC based on the determination of the count and the type of the set of VMs, wherein the cost criteria comprises minimizing service cost associated with the selection of the set of VMs, as shown in the equation below:

$$C_{ij}^v = \min \sum c_{jk}^\rho x_{ijk}$$

where, $c_{jk}^P$ denotes the cost of a VM instance of type k in cloud center and $x_{ijk}$ is a non-negative integer decision variable; and
    determine the optimal cloud center for the UC from amongst the plurality of cloud centers belonging to each of plurality of CSPs and a plurality of CSP combinations by using a cloud center selection model, the cloud center selection model applying at least a latency constraint, a location constraint and the consolidated cost to determine the optimal cloud center associated with the CSP for the UC;
  assign, based on a determination of the optimal cloud center for each of the plurality of CSPs and the plurality of CSP combinations, and a plurality of qualitative criteria, a rank to each of the plurality of CSPs and the plurality of CSP combinations using a multi-criteria decision-making (MCDM)technique ,wherein the plurality of qualitative criteria comprises at least a security criteria, a usability criteria and a manageability criteria, wherein the security criteria is indicative of a resistance level of a CSP to cyberattacks, data breaches, and compliance to security laws,
  wherein the usability criteria is indicative of a level to which the features offered by a cloud provider can be learned and used by the entity, and wherein the manageability criteria is indicative of a difficulty level for the entity in managing a multi-cloud, wherein the one or more hardware processors are configured by the instructions to compute the security criteria as a minimum of security levels of a distinct CSP associated with one of the CSP and the CSP combinations using the equation below:

$$E_N = \min_{i \in N} E_i$$

where, N is the set of CSPs in the multi-cloud, and $E_i$ is the security level of CSP i and $E_N$ is the security level of the multi-cloud; and
  select one of a CSP and a CSP combination from amongst the plurality of CSPs and the plurality of CSP combinations for each application of the one or more applications based on the ranks and a constraint on a service cost of the entity.

8. The system of claim 7, wherein the one or more compute requirements of the set of VMs comprises memory requirement, disk space requirement, processing speed, and number of cores, Computer processing Unit (CPU) compute power, Graphical Processing Power, one or more softwares, and an Operating System (OS).

9. The system of claim 7, wherein the one or more hardware processors are configured by the instructions to determine the optimal cloud center for the CSP based on the equation:

$$j^* = \operatorname{argmin}_{j \in u_{i=1}^t S_i} \{C_{ij}^v : l_{ij} \leq L \text{ and } \alpha_{ij} = 1\}$$

where, $S_1, S_2, \ldots, St$ are the set of cloud regions of the t CSPs considered in the multi-cloud.

10. The system of claim 7, wherein the one or more hardware processors are configured by the instructions to compute the usability criteria as the average weighted by the number of UCs served by each CSP of usability of the distinct CSPs, as shown in equation below:

$$B_N = \frac{\sum_{i \in N} \beta_i B_i}{\sum_{i \in N} \beta_i}$$

where,
N is the set of CSPs in a multi-cloud environment,
$\beta_i$ is the number of UCs served by CSP i,
$B_i$ is the usability of CSP l, and
$B_N$ is the usability of the multi-cloud.

11. The system of claim 7, wherein the one or more hardware processors are configured by the instructions to compute the manageability criteria using the equation:

$G_N = |N|$ where,
N is the set of CSPs in the multi-cloud, and
$G_N$ is the security level of the multi-cloud.

12. The system of claim 7, wherein the one or more hardware processors are configured by the instructions to:
select, for each of the one or more applications hosted by the entity, a CSP combination from amongst the plurality of CSPs, and
apply a constraint on a service cost and minimize a sum of the ranks of the CSP combinations selected for the one or more applications, based on the equations:

$$\min \sum_{p \in P} \sum_{q \in Q} r_{pq} y_{pq}$$

where, a constraint on an application hosted by one of exactly one CSP and CSP combination is given by the equation:

$$\sum_{q \in Q} y_{pq} = 1 \forall_p \in P$$

and where a total service cost of the applications constrained to be below an entity budget is given by the equation:

$$\sum_{p \in P} \sum_{q \in Q} y_{pq} s_{pq} \leq S$$

and, where a constraint to assign the bounds to the decision variables is given by the equation:

$y_{pq} \in \{0,1\} \forall_p \in P, q \in Q$.

13. One or more non-transitory machine readable information storage mediums comprising one or more instructions which when executed by one or more hardware processors cause:

enable, via one or more hardware processors, a plurality of user centers (UCs) to access a multi-cloud having a plurality of Cloud Service Providers (CSPs), each CSP of the plurality of CSPs comprising a plurality of cloud centers, each cloud center of the plurality of cloud centers capable of accessing a plurality of distinct virtual machines (VMs), each VM of the plurality of distinct VMs associated with distinct configuration, wherein the plurality of UCs accesses the multi-cloud to access one or more applications associated with an entity;

obtain, for a user center (UC) from amongst the plurality of UCs, an optimal cloud center from amongst the plurality of cloud centers associated with the plurality cloud service providers (CSPs), via one or more hardware processors, wherein obtaining the optimal cloud center comprises:

determining, for each CSP of the plurality of CSPs, a count and type of a set of VMs to be utilized for meeting compute demand of the UC, the count and the type of the set of VMs determined by using a virtual machine (VM) selection model based on one or more compute specifications of the set of VMs and a cost criteria, the set of VMs associated with a cloud center from amongst the plurality of cloud centers capable of serving the UC, wherein the cost criteria facilitates in determining a consolidated cost associated with serving the UC based on the determination of the count and the type of the set of VMs, wherein the cost criteria comprises minimizing service cost associated with the selection of the set of VMs, as shown in the equation below:

$$C_{ij}^v = \min \sum_{c_{jk}^p} x_{ijk}$$

where, $c_{jk}^p$ denotes the cost of a VM instance of type k in compute center j, and $x_{ijk}$ is a non-negative integer decision variable; and determining the optimal cloud center for the UC from amongst the plurality of cloud centers belonging to each of plurality of CSPs and a plurality of CSP combinations by using a cloud center selection model, the cloud center selection model applying at least a latency constraint, a location constraint and the consolidated cost to determine the optimal cloud center associated with the CSP for the UC;

assigning, based on a determination of the optimal cloud center for each of the plurality of CSPs and the plurality of CSP combinations, and a plurality of qualitative criteria, a rank to each of the plurality of CSPs and the plurality of CSP combinations using a multi-criteria decision-making (MCDM)technique, via the one or more hardware processors, wherein the plurality of qualitative criteria comprises at least a security criteria, a usability criteria and a manageability criteria, wherein the security criteria is indicative of a resistance level of a CSP to cyberattacks, data breaches, and compliance to security laws, wherein the usability criteria is indicative of a level to which the features offered by a cloud provider can be learned and used by the entity, and wherein the manageability criteria is indicative of a difficulty level for the entity in managing a multi-cloud, wherein the security criteria is computed as a minimum of security levels of a distinct CSP associated with one of the CSP and the CSP combinations using the equation below:

$$E_N = \min_{i \in N} E_i$$

where, N is the set of CSPs in the multi-cloud, and $E_i$ is the security level of CSP i and $E_N$ is the security level of the multi-cloud; and selecting, via the one or more hardware processors, one of a CSP and a CSP combination from amongst the plurality of CSPs and the plurality of CSP combinations for each application of the one or more applications based on the ranks and a constraint on a service cost of the entity.

* * * * *